(No Model.)
W. E. DELEHANTY.
TRAP FOR WATER BASINS, &c.
No. 462,304. Patented Nov. 3, 1891.
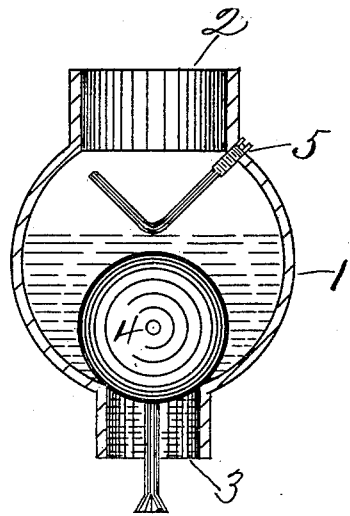
Fig: 1.
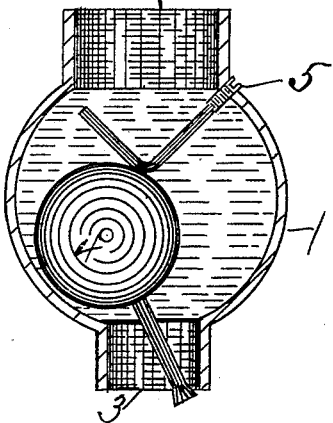
Fig: 2.
Witnesses.
J. F. Harris.
Chas. W. Marcy
Inventor.
William E. Delehanty
By. H. M. Brown
his atty.

UNITED STATES PATENT OFFICE.

WILLIAM E. DELEHANTY, OF ALBANY, NEW YORK.

TRAP FOR WATER-BASINS, &c.

SPECIFICATION forming part of Letters Patent No. 462,304, dated November 3, 1891.

Application filed February 18, 1891. Serial No. 381,806. (No model.)

*To all whom it may concern:*

Be it known that I, WILLIAM E. DELEHANTY, a citizen of the United States, residing at Albany, in the county of Albany and State of New York, have invented certain new and useful Improvements in Traps for Water-Basins, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is an improvement on my patented one, No. 427,752, dated May 13, 1890, and relates to traps for wash-basins, &c.

In the drawings, Figure 1 shows a vertical sectional view of my trap with the ball-valve upon its seat, and Fig. 2 a similar view with the ball-valve raised by flushing the trap.

A full description is as follows: The trap 1 has a ball-valve 4, preferably, and over the valve is a limiting device 5, which consists of a pin, preferably bent or curved at or near its center and preferably has a threaded elongated head with a slot for a screw-driver. The ball-valve 4 rests on its seat, which is preferably located at the upper end of induction-opening 3, and the eduction-opening 2 is of sufficient diameter to allow of the ball 4 being taken out and entered through that opening.

The operation is as follows: The limiting device 5 being preferably a round pin bent or curved practically as shown, it is set so as to assume the form of an inverted arch with its apex presented to the upper surface of the valve 4. When the trap is flushed, the ball rises off the seat and strikes against the bent pin 5 and is deflected to one side, and, as the pin 5 presents only upwardly-inclined surfaces to substances passing through the trap, nothing can adhere to the pin 5, and valve 4 is prevented from entering and choking eduction-opening 2.

What I claim, therefore, is—

In a trap having a valve-chamber and rising and falling valve therein, a bent or curved limiting device passing wholly or partly across the valve-chamber and in configuration forming substantially an inverted arch, that the rise of the valve in the trap may be limited and the limiting device present an upwardly-inclined surface to substances passing into the eduction-pipes, for the purposes described.

In testimony whereof I affix my signature in presence of two witnesses.

WILLIAM E. DELEHANTY.

Witnesses:
 M. MUNSELL,
 A. M. TURNER.